3,672,776
Patented June 27, 1972

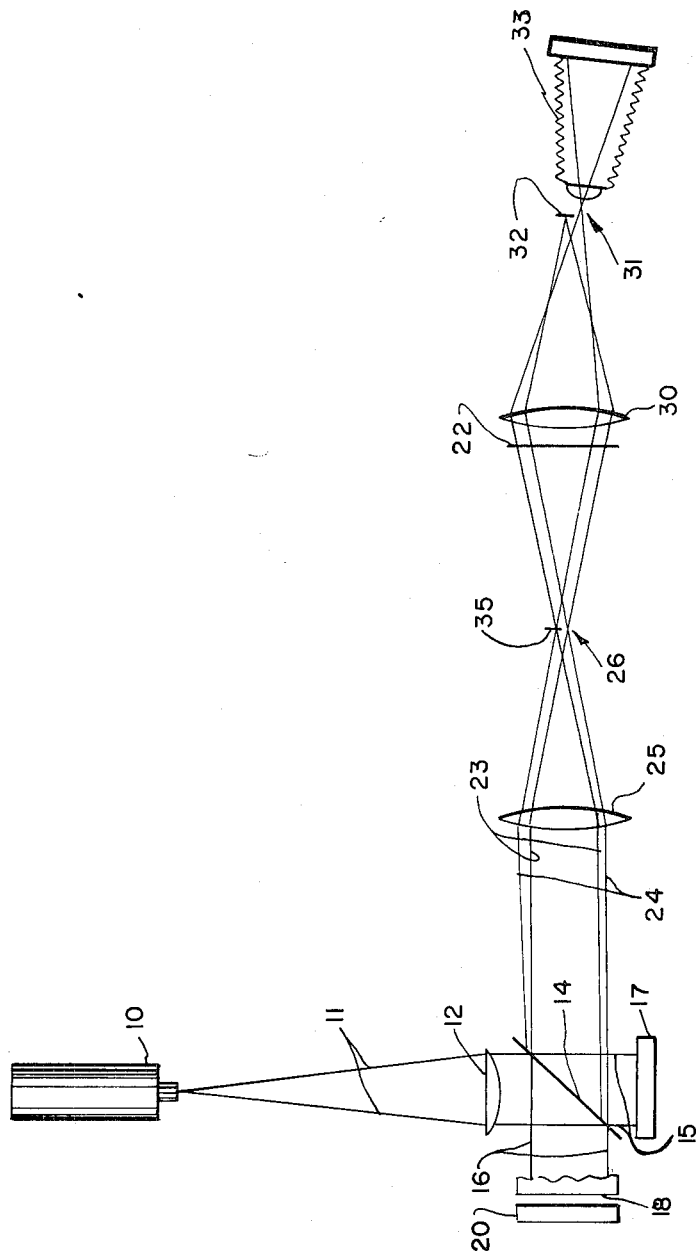

3,672,776
HOLOGRAPHIC REAL-TIME INTERFEROMETRY WITH A RECONSTRUCTED REFERENCE BEAM
Robert E. Brooks, Redondo Beach, Calif., assignor to TRW Inc., Redondo Beach, Calif.
Filed Oct. 9, 1970, Ser. No. 79,395
Int. Cl. G01b 9/02; G02b 27/00
U.S. Cl. 356—106                    14 Claims

ABSTRACT OF THE DISCLOSURE

The holographic interferometer makes use of the stored beam hologram for investigating a displaced or distorted object. Illumination of the stored beam hologram by the distorted object beam will cause the generation of a distorted reference beam. The subject beam is now blocked off and the distorted reference beam is allowed to interfere with the original reference beam. This will yield an interferogram or fringe pattern corresponding to the object deformation.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates generally to holographic interferometry and particularly to holography making use of the stored beam technique for obtaining live fringes of a displaced or distorted object.

In order to study transparent or specular objects by holography, it is generally preferred to illuminate the scene or object beam with nondiffuse light. If now the object is relatively irregular, the object or scene or scene beam will have a similar irregular wavefront. Such an irregular object beam is difficult to focus, either through the pupil of the observer or the iris of a recording camera.

It is accordingly an object of the present invention to provide apparatus for and method of generating interferometric fringes of a distorted or displaced object illuminated by nondiffuse light where the object may be specular but of quite irregular shape.

Another object of the invention is to make use of the stored beam holographic technique by viewing the changes of the scene by means of a distorted reference beam.

Another object of the invention is to provide a holographic system of the type referred to where the reconstructed and distorted reference beam carries all the information of the changes of the object.

SUMMARY OF THE INVENTION

The method of the present invention permits to perform real-time interferometry by means of a stored beam hologram. Thus, the original hologram is recorded in a conventional manner by generating a beam of monochromatic, coherent light which is subsequently split into a reference and a scene beam. The reference and scene beams are then recombined at a predetermined angle.

The recorded hologram is now viewed in the original apparatus by illuminating it with a reference and a scene beam. The scene beam carries the information of the distorted or displaced object. The scene beam is subsequently blocked, for example, by a suitable stop, and the interference fringes created by interference of the original stored reference beam and the distorted reference beam may be viewed by the eye of the observer or a camera.

The novel features that are considerd characteristic of this invention are set forth with particularity in the appended claims. The invention itself, however, both as to its organization and method of operation, as well as additional objects and advantages thereof, will best be understood from the following description when read in connection with the accompanying drawing.

BRIEF DESCRIPTION OF THE DRAWING

The single figure of the drawing is a schematic representation of apparatus that may be used for recording and reconstructing a hologram in accordance with the present invention.

DESCRIPTION OF THE PREFERRED EMBODIMENT

Referring now to the drawing, the single figure shows by way of example apparatus for recording a hologram and reconstructing it in accordance with the present invention to perform real-time interferometry. This is effected with nondiffuse light. The object may be specular and may have a quite irregular surface. Thus, the drawing shows a source 10 of monochromatic, coherent light for developing a light beam 11. The source 10 may consist, for example, of any suitable laser. The light beam 11 may be divergent as shown and thence may have a spherical wave front, although this is not necessary.

The divergent light beam 11 may be collimated by a suitable lens 12 which may be a positive lens as shown. The light beam is now split by a conventional beam splitter 14 shown by way of example as a semi-transparent mirror. Accordingly, the light is split into a reference beam 15 and a scene beam 16. The reference beam 15 may be reflected by a reflector or mirror 17 back onto the beam splitter 14, which now serves the additional purpose to recombine the two beams.

A suitable object 18 may be interposed in the path of the scene beam before it is recombined with the reference beam 15 by the beam splitter 14. As shown in the drawing, the object 18 may be a reflecting object. However, it will be understood that the object may also be transparent, in which case a suitable reflector should be positioned as shown at 20. Of course, the lengths of the reference and scene beam paths should generally be carefully matched so that they are equal, unless the laser 10 has a large coherence length. The scene beam 16, which has either been reflected by the object 18 or which has passed through the object 18 and been reflected by the mirror 20, is now passed through beam splitter 14 so that it is recombined with the reference beam 15.

The reference beam reflector 17 forms a predetermined angle with a vertical to the reference beam 15 so that the subject and reference beams are recombined at the plane of the hologram 22 with a small angle which may, for example, be on the order of 5°. It will be recognized that the interferometer just described is of the Twyman-Green type.

The object 18 may be imaged in or near the plane of the hologram 22 by an imaging lens 25. The lens has a focal area as indicated at 26.

As indicated before, the object 18 may have a surface which may be quite irregular. Accordingly, the object beam may present a highly irregular intensity distribution at the hologram unless the subject is focused at or near the hologram. The reason is that various small areas of the object individually reflect the light beam into different directions so that the light may be broken up until various small beams cross each other. The effect is somewhat like the light pattern seen at the bottom of a swimming pool while the water surface is wavy.

The hologram 22 may be recorded by any suitable light-sensitive recording medium such as, for example, a photographic plate or film or photochromic material.

After the hologram 22 has been recorded with the apparatus just described, the hologram may be developed or processed in any conventional manner.

Thereafter, the hologram 22 is replaced as precisely as possible in a suitable plateholder, not shown. The object 18 may now be viewed through the hologram 22 in a conventional stored beam holographic system.

However, as explained before, since the object may have a quite irregular surface, it will be difficult to pass the light from the object through the pupil of the observer or the iris of the camera; therefore, in accordance with the present invention, the reference beam is used for generating the interference fringes caused by the change of shape or by the displacement of the object.

To this end, there may be provided a viewing lens 30 disposed in the path of the light passing through the hologram. This will now focus both the reference and the scene beam in a focal area 31. Therefore, a stop 32 may be positioned in such a manner that the object beam is essentially blocked. Actually, various other beams are generated whent he hologram is reconstructed. This has been explained in the applicant's paper published in "Applied Optics," volume 8, page 2351, of November 1969. Thus, the stop 32 should be so arranged that it will pass substantially only the distorted reference beam. This may now be viewed either with the eye or with a recording camera 33.

The applicant's paper above referred to also proves mathematically that the distorted reference wave carries the information of the distortion of the object which are contained in the scene beam.

In order to have maximum visibility of the fringes, an attenuator 35 may be interposed into the path of the reference beam in the focal area 26 of the imaging lens 25. This is generally done only during the reconstruction of the hologram.

As shown in the applicant's paper previously referred to, the attenuation alpha should be chosen as follows:

$$\alpha = \beta S^2 / (t_b + \beta S^2) \quad (1)$$

wherein $\beta$ is the slope of the amplitude transmittance versus exposure characteristic of the recording medium at the bias point, and wherein $t_b$ is the bias transmittance, and where S is defined as follows:

$$\overline{S}(x,y) = S(x,y) \exp j\phi(x,y) \quad (2)$$

It will, however, be appreciated that the reference beam does not have to have a spherical wavefront but may have a plane wave front. Also, the imaging lens 25 and the viewing lens 30 are not essential for the operation of the system of the invention. What is essential is only that the original recorded reference beam interferes with the distorted, reconstructed reference beam to generate an interferogram or fringes indicative of the changes of the object. It will also be understood that the particular apparatus of the drawing is not essential for practicing the method of the present invention.

There has thus been described an apparatus for and method of performing real-time interferometry. This is effected by a stored beam hologram which is reconstructed to cause interference between the original reference beam and the reconstructed, distorted reference beam. This permits interferometry of a specular object having an irregular surface with nondiffuse light. This technique is useful for the thermal testing of cast mirror blanks, phase measurements through distorted glassware, or measurements of optical components such as condenser lenses having large aberrations.

What is claimed is:

1. The method of performing real-time interferometry of a distorted or displaced object by means of a stored beam hologram comprising the steps of:

(a) generating a beam of monochromatic coherent light;
    (b) splitting the light beam into a reference beam and a scene beam and recombining the reefrence and scene beams at a predetermined angle;
    (c) positioning an object in the scene beam before it is recombined with the reference beam;
    (d) disposing a light sensitive recording material in the path of the recombined reference and scene beams for recording a hologram thereon;
    (e) illuminating the recorded hologram with the reference beam and the scene beam of a distorted or displaced object; and
    (f) substantially passing only the light of the reference beam and of the reference beam distorted by the changed object to derive interference fringes indicative of the changes of the object.

2. The method of claim 1 including the additional step of imaging the object substantially on the recording material.

3. The method defined in claim 2, including the additional step of attenuating the reference beam when the hologram is reconstructed within the focal area of the combined reference and scene beams.

4. The method defined in claim 1 including the additional step of focusing the light having passed the recorded hologram.

5. The method defined in claim 4 including the additional step of stopping substantially all light except that of the disturbed and undisturbed reference beams substantially at the focal area of the focused light having passed the reconstructed hologram.

6. Apparatus for performing real-time interferometry of a distorted or displaced object by means of a stored beam hologram comprising:

(a) a source of monochromatic, coherent light for developing a light beam;
    (b) means for splitting said light beam into a reference beam and scene beam and for combining said reference and scene beams at a predetermined angle, whereby an object may be interposed into the path of said scene beam before it is recombined with said reference beam;
    (c) a light-sensitive recording medium disposed in a predetermined plane located in the path of said recombined scene and reference beams;
    (d) mechanism for reconstructing the hologram including positioning the displaced or distorted object for reilluminating the recorded hologram and additionally illuminating the recorded hologram with the reference beam; and
    (e) means disposed in the path of the light having passed the recorded hologram for substantially permitting only the light of the reference beams to pass, whereby interference fringes are created due to the interference between the original reference beam and the reference beam distorted by the changed object, said interference fringes being indicative of the changes of the object.

7. Apparatus as defined in claim 6 wherein an imaging lens is provided, said imaging lens being disposed in the path of said combined reference and scene beams for imaging the object substantially on said recording medium.

8. Apparatus as defined in claim 7 wherein an attenuator is disposed substantially at the focal area of said imaging lens for attenuating the reference beam when the recorded hologram is reconstructed.

9. Apparatus as defined in claim 6 wherein a viewing lens is provided, said viewing lens being disposed in the path of the light having passed through the recorded hologram.

10. Apparatus as defined in claim 9 wherein said means for passing substantially only the light of said reference beams consists of a stop disposed substantially at the focal point of said viewing lens.

11. Apparatus as defined in claim 9 wherein a recording camera is provided for recording the image created by said viewing lens.

12. Apparatus for performing real-time interferometry of a distorted or displaced object by means of a stored beam hologram comprising:
   (a) a laser for developing a light beam;
   (b) a beam splitter for splitting said light beam into a reference beam and a subject beam;
   (c) means directing said reference beam and said scene beam toward said beam splitter for combining said beams at a predetermined small angle, whereby an object may be interposed into the said scene beam between said beam splitter and said means for directing said scene beam;
   (d) an imaging lens interposed into the path of the combined scene and reference beams for focusing said object in a predetermined plane;
   (e) a light-sensitive recording medium disposed in said predetermined plane for recording a hologram;
   (f) means for reconstructing the hologram including positioning the displaced or distorted object for illuminating the previously recorded hologram and for projecting the reference beam thereon;
   (g) a viewing lens disposed in the path of the light having passed through the illuminated hologram; and
   (h) means disposed in the path of said light having passed said hologram and permitting substantially only the light of the original and the reconstruction reference beams to pass, whereby interference fringes are created due to interference between the original reference beam and the modified reference beam distorted by the changes of the object.

13. Apparatus as defined in claim 12 wherein said means disposed in the path of said light having passed said hologram consists of a stop disposed substantially at the focal area of said viewing lens.

14. Apparatus as defined in claim 12 wherein an attenuator is disposed substantially at the focal area of said imaging lens for attenuating the reference beam when the recorded hologram is reconstructed.

References Cited

FOREIGN PATENTS 1,929,981    1/1970    Germany _____ 350—3.5

OTHER REFERENCES

Enos, Contemporary Physics, vol. 8, No. 2, March 1967, pp. 153–170 (pp. 167–169 relied upon).

Froehyl et al., Optica Acta, vol. 16, No. 3, June 1969, pp. 343–362.

DAVID SCHONBERG, Primary Examiner

R. J. STERN, Assistant Examiner

U.S. Cl. X.R.

350—3.5